(No Model.)
J. S. O'BRIEN.
HOEING AND WEEDING MACHINE.
No. 354,925. Patented Dec. 28, 1886.
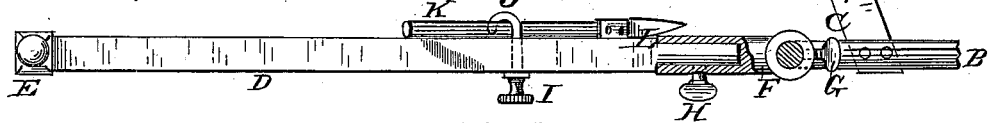
Fig. 1.
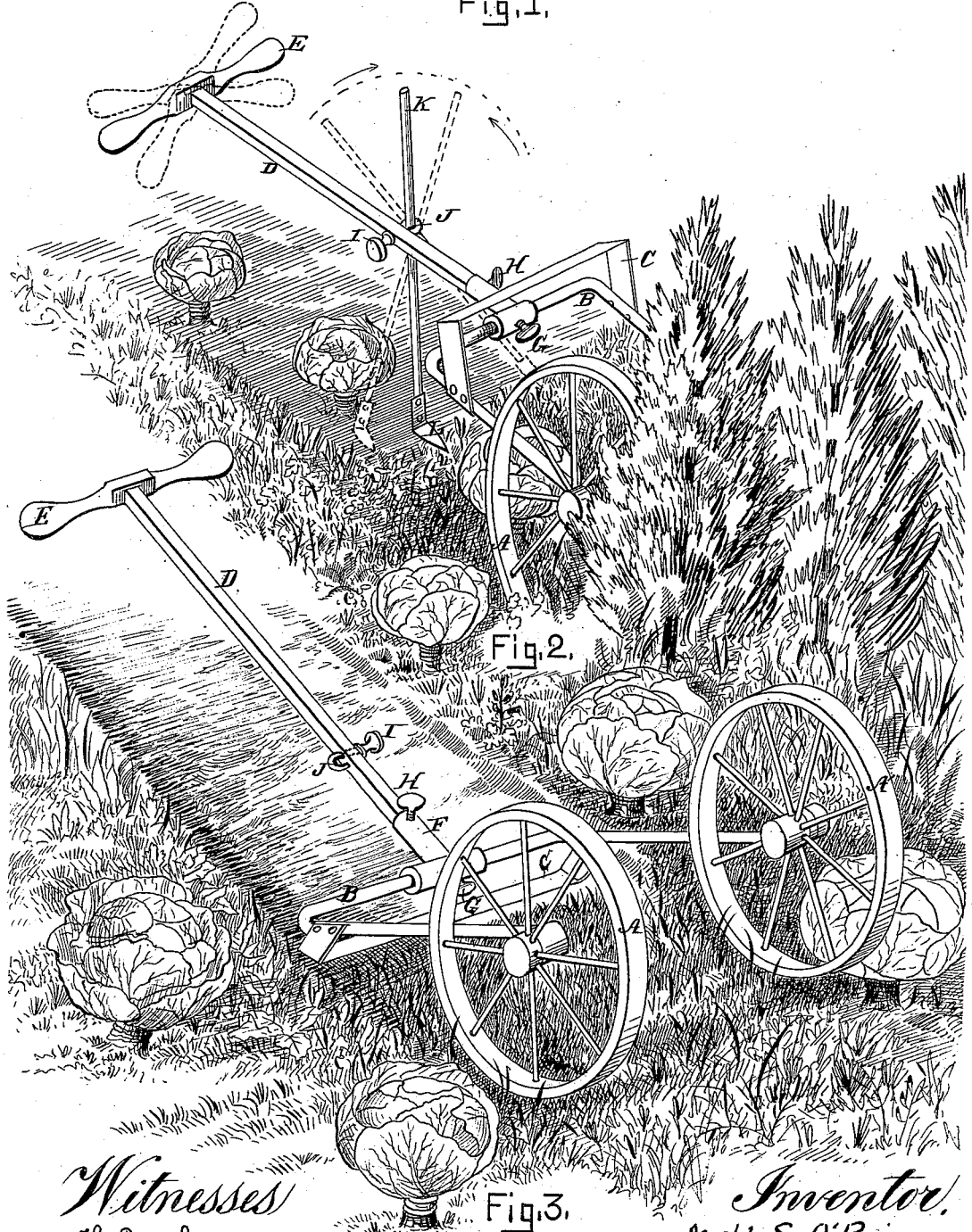
Fig. 2.
Fig. 3.
Witnesses
H. Dunham
L. D. Stimpson
Inventor
Joseph S. O'Brien

UNITED STATES PATENT OFFICE.

JOSEPH S. O'BRIEN, OF WILBRAHAM, MASSACHUSETTS.

HOEING AND WEEDING MACHINE.

SPECIFICATION forming part of Letters Patent No. 354,925, dated December 28, 1886.

Application filed August 21, 1886. Serial No. 211,565. (No model.)

*To all whom it may concern:*

Be it known that I, JOSEPH S. O'BRIEN, of Wilbraham, in the county of Hampden and State of Massachusetts, have invented a new and useful Improvement in Hoeing and Weeding Machines, of which the following, taken in connection with the accompanying drawings, is a specification.

My invention relates to agricultural tools, and its utility exists to cut out weeds and loosen the soil in gardens, both between the rows and between the several plants in a row.

My invention consists of a sharp blade attached to proper mechanism by which it is raised or lowered, the whole mounted upon a pair of light wheels and provided with a tongue or handle by which it may be pulled or pushed between the rows, the blade running slightly under the soil, cutting the weeds, and loosening the soil. In rear of this blade may be attached, if desired, rakes to drag the weeds away, teeth or disks to pulverize the earth, or shares to turn the earth upward against the plants, if desired. I also attach to the tongue before mentioned a vertical bar, at the lower end of which is a cutting-tool or hoe. When I desire to cut the weeds from between plants in a row, I raise the cutting-knife used in weeding between rows to such height that it may pass over the tops of plants. I then allow the wheels to stride the row, and as I pass along the row give the tongue or handle an oscillating motion, thereby giving the cutting-tool or hoe at lower end of bar a sweeping cut.

For further description of my invention, reference may be had to accompanying sheet of drawings, forming part of this specification, in which—

Figure 1 is a sectional side elevation of the said tongue and its mechanical attachment to the machine. Fig. 2 is a perspective view of my machine in operation as used to weed between plants in a row. Fig. 3 is a perspective view of my machine in position to operate to weed between rows.

Like letters of reference in the several figures indicate like parts.

A A' are the wheels. B is a U-shaped yoke by which the wheels are connected. C is the blade for cutting between rows. D is the tongue. E is a handle on the tongue. H is a set-screw by which the tongue D may be bound into tubular knee F to prevent the tongue from longitudinal revolution. F is a tubular knee encircling yoke B and holding at its extension the tongue D. G is a set-screw by which the knee F may be bound to the yoke B in such position that any desired elevation of the handle E may be acquired. I is a set-screw by which the hook J may be governed to grip and hold the bar K. J is a hook governed by screw I. K is a bar carrying the cutting-tool L. L is a cutting-tool or hoe for weeding between plants.

To operate my invention to weed between rows, I place my machine in the position shown in Fig. 3, elevating the handle E to a convenient position, and fix this relative position arbitrarily by set-screw G. I then press downward, so that blade C may travel slightly under the surface and cut the weeds below the surface as pressed forward. The ground will then present the appearance shown in Fig. 3 in rear of machine.

To operate my machine to weed between plants, I throw the yoke B completely over, so that the blade C may be on the upper side, as shown in Fig. 2. I then raise the handle E to a convenient height, and also raise the yoke B sufficiently to pass over tops of plants, and fix these relative positions by the set-screw G. I then place the bar K in hook J, and fasten it in proper position by screw I. I then place the wheels astride the row, as shown in Fig. 2. I now release set-screw H, so that tongue D may perform a longitudinal revolving motion in the knee F, and as I push the machine along the row I transmit an oscillating motion by the handle E to the tongue D, thus causing the bar K to sweep from side to side and the hoe L to cut out the weeds in the manner shown in Fig. 2, the motion of handle E, bar K, and hoe or cutting-tool L being there shown by dotted lines.

I have in this specification shown the structure I prefer, but do not confine myself thereto in formal detail, as the yoke B, for instance, may be attached either inside or outside the wheels, as may be found preferable, and the set-screw fastenings may be changed to any known mechanical means of holding the parts in position.

Having thus described the construction, utility, and operation of my machine, I claim as my invention—

1. In a hoeing-machine, the combination of the wheels A A', yoke B, blade C, secured to said yoke, tubular knee F, and set-screws G and H, passing into said knee, as described, tongue D, and handle E, all substantially as described, and for the purpose set forth.

2. In a hoeing-machine, the combination of the wheels A A', yoke B, tubular knee F, and set-screws G and H, passing into said knee, tongue D, handle E, and screw I, passing into said tongue, hook J, secured to said tongue, as described, with the bar K and tool L, all substantially as described, and for the purpose set forth.

In testimony whereof I have signed my name to this specification, in the presence of two subscribing witnesses, on this 3d day of August, A. D. 1886.

JOSEPH S. O'BRIEN.

Witnesses:
WILLIAM W. LEACH,
L. E. MOORE.